Patented Jan. 22, 1952

2,582,976

UNITED STATES PATENT OFFICE 2,582,976

PREPARATION OF A STABILIZED DEHYDRATED MONTMORILLONITE CATALYST

Eric William Musther Fawcett and John Norman Haresnape, Sunbury-on-Thames, England, assignors to Anglo-Iranian Oil Company Limited, London, England, a British joint-stock corporation No Drawing. Application January 2, 1948, Serial No. 356. In Great Britain January 10, 1947

2 Claims. (Cl. 252—449)

The invention relates to novel catalysts for use in reactions involving hydrocarbons or hydrocarbon-containing feedstocks, and more particularly to novel catalysts for the cracking of petroleum oils which are also active promoters of dehydrogenation reactions. The invention also relates to methods of preparing such novel catalysts.

It is well known that the catalytic cracking of petroleum fractions of high molecular weight yields valuable products such as gasolines of high octane number, and that if the reaction conditions are correctly controlled excessive carbon or coke formation may be avoided and the formation of hydrocarbon gases containing less than three carbon atoms in the molecule may be considerably reduced.

The catalysts, for commercial operation, may consist of mixed silica-alumina gels, but other catalysts are known which are capable of yielding products similar in their general nature of those obtained in the use of the silica-alumina gels. Certain of these other catalysts, as for example those of the silica-alumina-zirconia type, are known to be more efficient than the silica-alumina gels, but are not in general use as cracking catalysts for economic reasons.

Examples of other catalysts previously proposed for cracking petroleum fractions are those produced by leaching a natural montmorillonite with strong mineral acid and roasting to remove water. Generally the purer montmorillonites are preferred, in particular those having a low iron content, since a high iron content is associated with the deposition of a large amount of carbon on the catalyst during cracking. Catalysts of this last type while cheaper than the silica-alumina-zirconia type are not widely used in commercial practice because of their short life under conditions of exposure to heat and steam.

A considerable amount of investigation into the general effect of this whole class of cracking catalysts has been carried out (see for example the recent publications of Greensfelder and Voge, Ind. Eng. Chem. 37 pp. 514–520, 983–988, 1038–1043, 1168–1178, (1945)), from which it is possible to draw certain general conclusions.

It has been observed for example that except in the case of special types of molecule, the dehydrogenating activity of this group of catalysts is not large, and so the gaseous product usually contains relatively small proportions of hydrogen. This is consistent with results obtained in the cracking of petroleum fractions containing molecules of a wide range of types, where the hydrogen produced rarely exceeds 30% of the total gas by volume or 0.3% by weight on feed. Even when the feedstock consists of pure six-ring naphthenes, dehydrogenation to aromatics and hydrogen, though observable, is not the predominant reaction.

It is an object of the present invention to provide a cracking catalyst which has a greatly increased activity as a catalyst for dehydrogenation reactions.

It is another object of the invention to provide a stable cracking catalyst in the use of which greatly increased yields of gases containing a high proportion of hydrogen may be obtained in the cracking reaction.

It is a further object of the invention to enable montmorillonite cracking catalysts, which have lost a large part of their activity as conventional cracking catalysts, to be converted into cracking catalysts capable of producing high gas yields during the cracking reaction.

We have found that a mineral possessing a crystal lattice of the type of montmorillonite and having a low content of iron may be converted into a form in which it is active in catalysing dehydrogenation and other reactions of hydrocarbons, by completely dehydrating the mineral. Montmorillonite may be represented by the approximate formula $Al_2O_3.H_2O.4SiO_2.xH_2O$, with the $Al_2O_3$ partially replaced by iron oxide, magnesium oxide, sodium oxide and the like, and the effect of heating is first to eliminate the $x$ molecules of water at a temperature of 100–200° C., and thereafter to eliminate the combined hydroxyl groups as water at a much higher temperature. In the case of the desirable montmorillonite catalysts having a low iron content, we have found that the temperature necessary to remove the combined hydroxyl groups from all or part of the catalyst lies outside the temperature range within which the catalytic cracking operations, including the step of regenerating the catalyst, are normally carried out. "Dehydrating" or "dehydrated" as used in connection with the present invention does not simply imply that the water of hydration has been removed but in addition the water of constitution or combined hydroxyl groups. Although montmorillonite may be represented by the above-noted approximate formula, a more accurate formula, is $Al_2Si_4O_{10}(OH)_2.xH_2O$, with the aluminium atoms partially replaced by other atoms such as iron, magnesium and sodium. Dehydration of such a mineral in the ordinary sense consists in the removal of the $x$ molecules of water of hydration but this is not sufficient to produce the increased hydrogen-producing activity of the mineral, the critical point in this respect being the removal of the combined OH groups in the mineral. "Dehydrating" or "dehydrated," whenever used in connection with the present invention therefore, implies the removal of these combined hydroxyl groups.

According to the invention, a catalyst active in the dehydrogenation and cracking of hydrocarbons, is prepared by heating a naturally occurring mineral having a $Fe_2O_3$ content of no more than 5% by weight and possessing a crystal lattice of the type of montmorillonite so as to remove substantially completely as water the combined hydroxyl groups from at least part of the mineral, the $Fe_2O_3$ content of the mineral being such that after dehydration it is not more than 5% by weight and the heating being carried out in the absence of added $H_2S$. The activity of the catalyst may be increased by leaching with mineral acid either before or after dehydration. It is ordinarily necessary to heat the mineral to a temperature of at least 600° C.

The combined hydroxyl groups may be removed from a part or all of the catalyst, since the dehydrogenating type of activity begins to appear as soon as the loss of the combined hydroxyl groups commences. In practice, it is improbable that all of the mineral is completely dehydrated in heating to the determined temperature.

The activity of catalysts according to the present invention as dehydrogenation catalysts tends to decline if they become rehydrated either prior to use as a catalyst, or at some stage in the catalytic cracking process, as for instance by exposure to steam at high temperature. According to a further feature of the invention, such decline may be prevented or reduced by treatment of the catalyst, while in the dehydrated state, with hydrogen sulphide at a temperature of about 850° F. It is possible that the hydrogen sulphide molecules enter into the structure of the montmorillonite in substitution for the water removed on dehydration. The necessary treatment with hydrogen sulphide may be effected by using the dehydrated catalyst, before is had an opportunity of becoming rehydrated, to crack a feedstock containing sulphur whereby hydrogen sulphide is liberated as the cracking reaction proceeds. On the other hand, the dehydrated catalyst may be treated with hydrogen sulphide in a separated operation prior to being used as a cracking catalyst.

We have also found that an acid treated montmorillonite catalyst of low iron content, which has lost a large part of its acivity for catalytic cracking, may be converted into a stable catalyst according to the present invention simply by heating to a temperature sufficient to dehydrate the catalyst substantially completely. Such application of the invention is of particular advantage inasmuch as spent montmorillonite cracking catalysts, which would normally be discarded, may be converted into valuable catalysts according to the present invention.

As an example, a catalyst according to the present invention may be prepared from a bentonite, (consisting essentially of montmorillonite) having the analysis (a) and after acid treatment the analysis (b) in Table 1 below. This material requires heating to a temperature of 650°–700° C. to remove the combined hydroxyl groups.

Table 1

| Constituent | | a | b |
|---|---|---|---|
| $SiO_2$ | per cent wt | 50.5 | 50.2 |
| $Al_2O_3$ | do | 17.0 | 8.2 |
| $Fe_2O_3+FeO$ | do | 1.1 | 0.4 |
| $CaO$ | do | 4.2 | 1.9 |
| $MgO$ | do | 5.4 | 0.9 |
| $H_2O$ | do | 23.8 | 35.5 |

Using a catalyst prepared according to the present invention, we have found that there is a considerable change in the distribution of the products compared with that obtained on the synthetic silica alumina catalyst or on the corresponding natural catalyst before dehydration. The most striking difference is on the gaseous product. At equal conversions of the feedstock to lower boiling products the make of gas may be more than doubled in volume, but the increase is entirely accounted for by the increase in hydrogen content. Thus, whereas on a syunthetic silica-alumina catalyst or on a natural catalyst which is not dehydrated the product gaseous at −40° C. obtained when catalytically cracking an Iranian waxy distillate boiling in the range 650–900° F. contains 25% $H_2$, on the anhydrous catalyst according to the invention it contains 40° under a wide variety of conditions and may contain as much as 80%; and whereas on the former catalysts it does not exceed 150 cu. ft./bbl. of feedstock processed, on the anhydrous catalyst according to the invention it may be as high as 680 cu. ft./bbl. Other differences in the products are that at similar conversion of feedstock to lower boiling products, the conversion to gasoline is rather lower and that to gas-oil rather higher on the anhydrous catalyst according to the invention.

The gasoline contains a larger proportion of the less volatile components and the decrease is almost entirely confined to the fractions boiling below 100° C. This may be an advantage in any refinery where the more volatile hydrocarbons are in excess of requirements for balanced production. The octane number of the gasoline and the quality of the gas-oil are similar to those of the products obtained on undehydrated natural catalysts. The large make of hydrogen is associated with an increase in specific gravity in the residue of feedstock boiling range, and is probably attributable to the conversion to aromatic hydrocarbons of a large proportion of this uncracked residue. Under comparable conditions of temperature, contact time and the like the conversion of feedstock to lower boiling hydrocarbons is rather less on the anhydrous catalyst according to the invention, than on a synthetic silica-alumina catalyst or on an undehydrated natural clay catalyst, but this can be compensated for in a continuous unit by operating both the reaction and regeneration steps at a higher temperature, since with the anhydrous catalyst according to the invention it is not necessary to limit so severely the maximum temperature to which it is subjected, in order to prevent decrease in the activity of the catalyst.

Three examples of gas mixtures obtained in cracking the above mentioned wax distillate in the use of catalysts prepared in accordance with the present invention are given in the following Table 2.

Table 2

| Constituent | a | b | c |
|---|---|---|---|
| $H_2$ | 63.0 | 68.6 | 77.1 |
| $CH_4$ | 13.0 | 8.4 | 7.2 |
| $C_2H_4$ | 4.3 | 1.4 | 1.9 |
| $C_2H_6$ | 7.1 | 6.1 | 3.7 |
| $C_3H_6$ | 3.9 | 4.4 | 2.4 |
| $C_3H_8$ | 3.2 | 3.0 | 2.2 |
| $C_4H_8$ | 2.1 | 2.8 | 3.1 |
| $C_4H_{10}$ | 1.2 | 3.9 | |
| $C_5+$ | 1.8 | 0.8 | 1.8 |
| $H_2S$ | 0.4 | 0.5 | 0.6 |

For many purposes these gases are sufficiently rich in hydrogen for use as produced, but may if required be further purified by any known method.

The following are examples of cracking operations carried out with catalysts prepared in accordance with the invention.

Example 1

A waxy distillate feedstock boiling in the range 650–900° F. and representing the portion obtained between 68.6 and 79.0% wt., in a fractional distillation of an Iranian crude oil, and containing 1.5% by weight of combined sulphur, was cracked over a catalyst which had previously been heated to a temperature of 1250° F. and which had before heating the analysis (b) of Table 1. The catalyst was in the form of pellets, the temperature 850° F., throughput 0.6 v./v./hr. and pressure atmospheric. Operation was in 3-hour cycles, the catalyst being used for 2 hours for cracking and then regenerated by passing air over the catalyst. The product consisted of 20.3% gasoline distilling below 430° F., 25.2% gas oil, distilling between 430 and 740° F., 42.4% residue distilling above 740° F., 5.0% carbon deposited on the catalyst and 7.1% gas. The gas amounted in volume to 580 cu. ft. (measured at 60° F., and atmospheric pressure) per barrel of feedstock processed and had the analysis (b) of Table 2.

Example 2

An acid-treated montmorillonite catalyst of the conventional type, having a combined $Fe_2O_3+FeO$ content of 0.4% by wt. and which had lost a large part of its activity on long use for catalytic cracking, was dehydrated by heating to 700° C. and was then used for further catalytic cracking, employing the same feedstock and conditions as in Example 1. The products consisted of 14.7% gasoline distilling below 430° F., 25.4% gas oil distilling between 430° F. and 740° F., 48.6% of residue distilling above 740° F., 3.8% of carbon deposited on the catalyst and 7.4% of gas. The gas amounted in volume to 530 cu. ft. per barrel of feedstock processed and contained 69.7% by volume of hydrogen.

We claim:

1. A method of preparing a catalyst for use in the dehydrogenation and cracking of hydrocarbons which comprises heating, in the absence of added $H_2S$, a mineral having a crystal lattice of the type of montmorillonite to remove substantially completely as water the combined hydroxyl groups from at least part of said mineral and subjecting the dehydrated montmorillonite to treatment with hydrogen sulfide to stabilize it against rehydration.

2. A method according to claim 1, wherein said treatment with hydrogen sulphide is effected by using the dehydrated montmorillonite as a catalyst in the cracking of a sulphur-containing feedstock.

ERIC WILLIAM MUSTHER FAWCETT.
JOHN NORMAN HARESNAPE.

REFERENCES CITED

The following references are of record in the file of this patent:

UNITED STATES PATENTS

| Number | Name | Date |
|---|---|---|
| 2,388,616 | La Lande | Nov. 6, 1945 |
| 2,395,198 | Schulze | Feb. 19, 1946 |
| 2,432,822 | Secor | Dec. 16, 1947 |
| 2,464,127 | Gary | Mar. 8, 1949 |
| 2,466,048 | Shabaker | Apr. 5, 1949 |
| 2,477,019 | Utterback et al. | July 26, 1949 |
| 2,484,828 | Hickey | Oct. 18, 1949 |

OTHER REFERENCES

Petroleum Refiner, vol. 26, No. 9, Sept. 1947, pages 80–83. Copy in Div. 31.

Grenall, "Montmorillonite Cracking Catalyst," Ind. and Engr'g Chem., vol. 40, No. 11, pages 2148–2151. Copy in 252—449.